United States Patent
Wilting et al.

(10) Patent No.: US 6,430,432 B1
(45) Date of Patent: Aug. 6, 2002

(54) DERIVING DIMENSIONS OF A DETAIL OF AN OBJECT

(75) Inventors: Jantje E. Wilting; Jan Timmer, both of Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/469,457

(22) Filed: Dec. 21, 1999

(30) Foreign Application Priority Data

Dec. 21, 1998 (EP) .............................. 98204353

(51) Int. Cl.[7] .............................................. A61B 5/05
(52) U.S. Cl. ..................... 600/425; 128/916; 382/128; 382/131; 378/72
(58) Field of Search ...................... 128/916; 600/425, 600/407, 410, 437; 382/128, 131; 378/62

(56) References Cited

U.S. PATENT DOCUMENTS 5,924,991 A * 7/1999 Hossack et al. ............ 600/443

FOREIGN PATENT DOCUMENTS

WO        9713457        4/1997  ........... A61B/6/00

OTHER PUBLICATIONS

"Digital measurement of blood vessels diameters on chest radiographs" by F. Loup et al., Proceedings of the Annual Interantional Conference of the Engineering in Medicine and Biology Society, US, New York, in IEEE, vol. Conf. 14, 1992, pp. 1940–1941.

Shape–Based Interpolation of Tree–Like Structures in Three Dimensional Images, by W.E. Higgins et al., in IEEE Transactions on Medical Imaging, US, IEEE Inc., New York, vol. 12, No. 3, Sep. 1, 1993, pp. 439–450.

* cited by examiner

Primary Examiner—Marvin M. Lateef
Assistant Examiner—Jeoyuh Lin
(74) Attorney, Agent, or Firm—John Vodopia

(57) ABSTRACT

The size of a detail of an object is derived from a data set of data values relating to the object. The data set assigns the data values to positions in a multidimensional space. A direction is selected in the multidimensional space. The spatial resolution of the data set is higher in the selected direction as compared to the spatial resolution in other directions. The size of the detail is derived from data values in the selected direction. The selected direction can extend along the line of intersection which intersects a scanning plane in which the data values are acquired and a transverse plane extending at right angles to the longitudinal axis of the detail. The data values can be acquired an X-ray computed tomography imaging system, a magnetic resonsance imaging system, or a 3D ultrasound imaging system.

9 Claims, 2 Drawing Sheets

DERIVING DIMENSIONS OF A DETAIL OF AN OBJECT

BACKGROUND OF THE INVENTION

The invention relates to a method of deriving a dimension of a detail of an object from a data set of data values assigned to a multidimensional space and relating to the object. The invention also relates to a data processor for deriving a dimension of a detail of an object from a data set of data values assigned to a multidimensional space and relating to the object.

A method and a data processor of this kind are known from the international patent application WO 97/13457.

The data set assigns data values to positions in the multidimensional space. The data set notably comprises density values which represent the spatial density distribution of the object. The known method enables the dimensions of a detail, particularly of a blood vessel, to be derived from the data set, notably density values of a patient to be examined. Determination of stenosis of a blood vessel, necessitates accurate determination of the width of the relevant blood vessel. To this end, the known method includes the acquisition of a density profile and a maximum density value of the detail is derived from the density profile. Subsequently, according to the known method there are determined edge points where the density values in the density profile amount to half the maximum density value. The width of the blood vessel is subsequently calculated from the distance between edge points. Even though the known method for the calculation of the width of the blood vessel takes into account the fact that blurring may be involved in the measured data set, it has been found that inaccuracies occur in the measurement of the width of the blood vessel nevertheless.

Inaccuracies in the determination of the width of blood vessels from data acquired by means of computed tomography are also discussed in the article "Evaluating the potential and problems of three-dimensional computed tomography measurements of arterial stenosis" by David S. Ebert et al in Journal of Digital Imaging 11 (1998), pp. 151–157.

SUMMARY OF THE INVENTION

It is an object of the invention to provide a method of deriving the dimension of a detail of an object from the data set with an accuracy which is superior to that of the known method. It is notably an object of the invention to avoid inaccuracies due to differences in the spatial resolution in different directions during the determination of the dimension.

This object is achieved by a method according to the invention which is characterized in that a preferential direction is chosen in the multidimensional space, the spatial resolution of the data set of data values in the preferential direction being higher than the spatial resolution of the data values in at least one direction other than the preferential direction, the dimension of the detail being derived from data values in the preferential direction.

The data set of data values essentially has the highest spatial resolution in the preferential direction. The resolution represents the smallest dimension of details in the object which can still be faithfully reproduced by the data set. The smaller the smallest faithfully reproduced detail, the higher the spatial resolution will be. Specifically, in comparison with other directions the least blurring has occurred in the preferential direction during the measurement of the data set. It has been found that notably inaccuracies are avoided which, if no further steps were taken, would occur when the spatial resolution of the data set differs in different directions in the object. For example, when the data set is acquired by means of an X-ray computed tomography method, the preferential direction is situated in the scanning plane. This is because it appears that in the case of X-ray computed tomography the highest spatial resolution by far occurs in the scanning plane. In X-ray computed tomography an X-ray source and an X-ray detector are rotated together about the patient in the scanning plane. During the rotation of the X-ray source and the X-ray detector, the patient on the one side and the X-ray source with the X-ray detector on the other side can be displaced relative to one another, notably in the longitudinal direction of the patient, so that the X-ray source and the X-ray detector travel along a helical path relative to the patient. In that case the scanning plane is shifted relative to the patient during the rotation; the scanning plane is notably shifted along the longitudinal axis of the patient. In various orientations of the X-ray source and the X-ray detector, relative to the patient to be examined, the patient is irradiated by means of X-rays and density profiles of the patient to be examined are acquired by measuring the X-ray absorption in different directions in the body of the patient to be examined. Density values in different positions in the body of the patient are reconstructed from the values of the X-ray absorption measured in different directions. When the data values in the preferential direction is utilized to derive the dimension of the detail, the dimension is particularly accurately derived from the data set. The effects of blurring during the determination of the dimension of the detail can thus be avoided to a significant extent. The method according to the invention is particularly suitable for the determination of the dimensions of details whose dimensions hardly differ in various directions. For example, the method according to the invention is particularly suitable for determining the dimensions of the cross-section of arteries of a patient to be examined, because arteries practically always have a substantially round cross-section. The invention notably offers the advantage that an accurate result is obtained for the dimension of the detail of the object, such as the width of the artery, when the resolution of the data set is high in one direction, being the preferential direction, and is low relative to the dimension of the detail in another direction.

While the invention was described herein with an employment of an X-ray computed tomography imaging technique to acquire the data values, the invention may be employed with other techniques to acquire the data values, such as, for example, a magnetic resonance imaging technique or a 3D ultrasound imaging technique.

The data values are preferably acquired in one or more scanning planes. It has been found that the spatial resolution of the data values in such a scanning plane is substantially higher than that in directions outside the scanning plane. This means that the preferential direction is situated in the scanning plane or extends parallel to the scanning plane. The invention is particularly suitable for determining the dimensions of a cross-section of an elongate detail of the object. An artery in the body of the patient to be examined constitutes an example of such an elongate detail. The transverse plane of such an elongate detail is determined substantially perpendicularly to the longitudinal axis. According to the invention the dimension of a detail can be accurately determined by deriving the dimension from data values in the preferential direction. It has been found that the preferential direction is usually situated in the scanning plane in which the data values are acquired. This is the case notably when the data values are acquired by means of an X-ray computed tomography method. In case the transverse plane is situated parallel to the scanning plane, the dimension of the detail can be simply derived from data values in an arbitrary direction in the transverse plane, because the data values are blurred only slightly in essentially all directions in the transverse plane. The invention offers the advantage of accurate results concerning the dimension of the detail also in the case of data sets acquired by means of a magnetic resonance imaging system or a 3D ultrasound method.

Furthermore, the dimension of the detail is preferably derived from data values relating to a perpendicular cross-section of the detail, thus avoiding, the involvement of an oblique projection, relative to the longitudinal axis of the detail, in the determination of the cross-section of the detail. To this end, the (local) longitudinal axis of the detail is derived from the data values in the data set; it is to be noted, however, that the longitudinal axis of the detail can also be derived from anatomical information. The transverse plane is situated substantially perpendicularly to the local longitudinal axis of the detail. The data values which are blurred the least and relate to the cross-section of the detail lie along the line of intersection of the transverse plane and the scanning plane. The width of the detail can thus be accurately determined by deriving the dimension from the data values along the line of intersection. The occurrence of inaccuracies in the determination of the dimension which are due to oblique cross-sections or blurring of the data values is thus avoided as well as possible.

The dimensions of the detail, such as the width of the artery, are accurately determined, for example by determining the locations where strong gradients occur in the data values in the preferential direction. Such gradients represent the edges of the artery; it is notably when the artery is filled with an X-ray-absorbing contrast medium during the acquisition of the data values by means of X-ray computed tomography that the density values in the artery are substantially higher than the data values of the surrounding tissue. Another approach for accurately determining the width of the artery is to determine the locations where the data values amount to a predetermined fraction, for example half, of the maximum density value in the detail, for example the artery. It has been found that the positions in which the density value amounts to half the maximum density value offer an accurate indication of the edges of the artery.

The method according to the invention yields an accurate dimension of the detail, for example the width of the artery. This result is a technical aid that can be used by a physician in making a diagnosis in respect of arterial stenosis in the patient to be examined.

These and other aspects of the invention are apparent from and will be elucidated, by way of example, with reference to the embodiment described hereinafter and the accompanying drawing; therein:

DETAILED DESCRIPTION OF THE PREFERRED EMBODIMENTS

Figure 1:
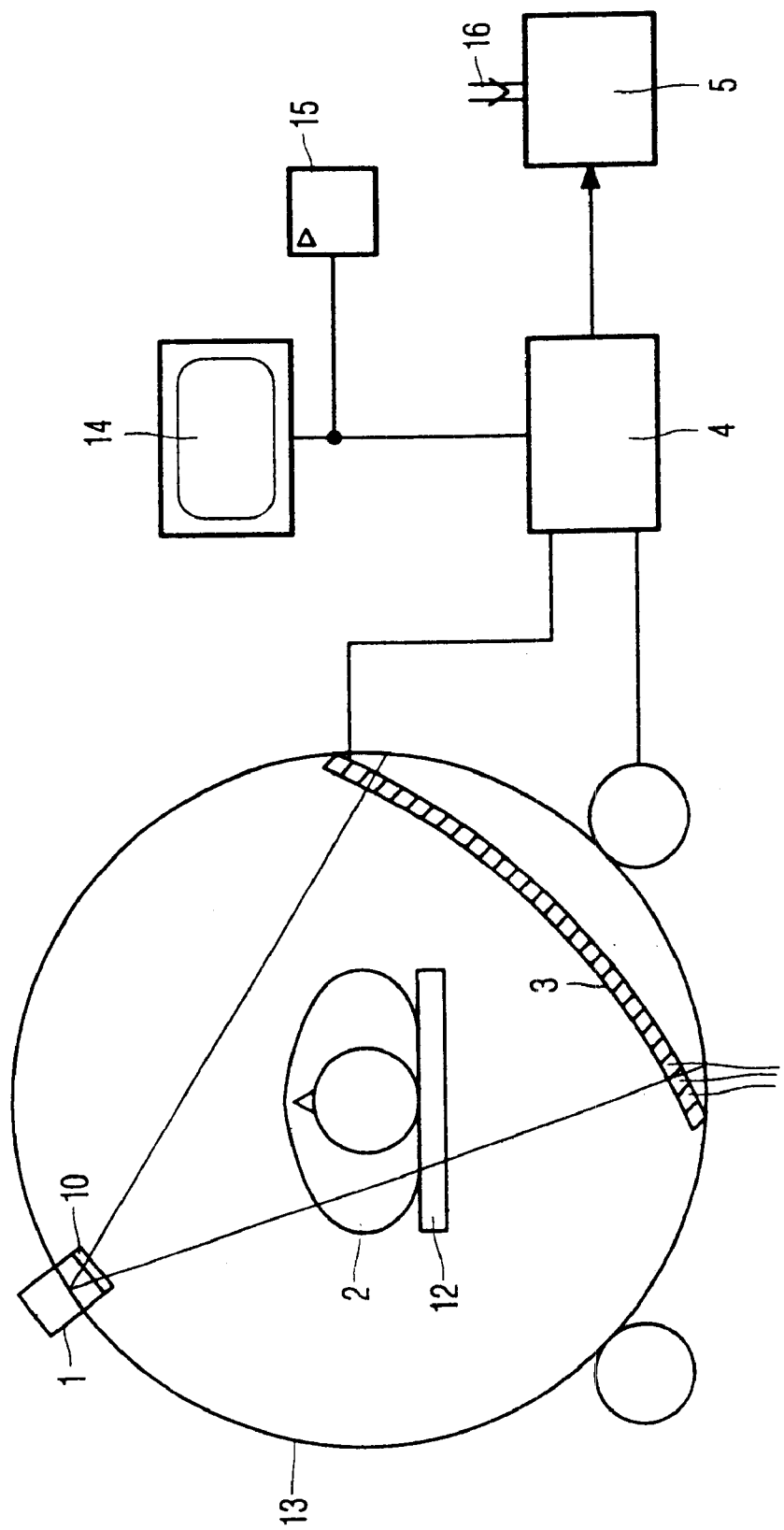
FIG. 1 is a diagrammatic representation of a computed tomography device according to the invention.

FIG. 1 is a diagrammatic representation of a computed tomography device according to the invention. An X-ray source 1 supplies, in conjunction with a slit-shaped diaphragm 10, a diverging flat (fan-shaped) X-ray beam in order to irradiate the object 2, for example a patient to be examined. Opposite the X-ray source 1 there is arranged an X-ray detector 3. The X-ray detector in the present embodiment is a position-sensitive X-ray detector which includes a row of individual detector cells 11. The detector cells 11 are, for example, gas-filled (xenon) detectors or solid-state detectors. The thickness of the fan-shaped X-ray beam generally amounts to between 1 mm and 10 mm, measured halfway between the X-ray source and the X-ray detector. The intensity of the radiation having traversed the patient and being incident on the X-ray detector is determined mainly by the absorption within the patient 2 who is arranged on a table 12 between the X-ray source and the X-ray detector. By rotating the X-ray source 1 and the X-ray detector 3 together about the patient by means of a frame 13, the absorption is measured along a large number of lines from a large number of directions. The common rotation of the X-ray source and the X-ray detector may be continuous but also intermittent. Furthermore, during the irradiation and the rotation the patient can also be displaced along the axis of rotation so that the X-ray detector acquires data from a significant three-dimensional volume of the patient. Besides a rotatable frame with an X-ray source and an X-ray detector, the computed tomography device may also include a detection system which is not rotatable but extends across (substantially) the entire circumference around the patient. Generally speaking, the X-ray source and the X-ray detector together are rotated completely around the patient, so through 360°. Alternatively, a detection system can be arranged all around the patient, in which case the X-ray source is rotated completely around the patient. Furthermore, the X-ray source may also be formed by an annular anode which is arranged around the patient; the point of incidence of an electron beam, used to generate X-rays from the anode material, then moves around the patient together with the annular anode. However, it suffices in principle to use a fan-shaped beam which rotates about the patient through an angle which amounts to the sum of 180° and the angle of aperture of the fan-shaped beam.

The intensity of the X-rays received by the individual detector cells in every position or orientation of the X-ray source and the X-ray detector is digitized and applied to the reconstruction unit 4. After correction for known error sources and disturbances, in the reconstruction unit 4 this measuring data is converted into density profiles of the patient to be examined. The reconstruction unit reconstructs density distributions in the body of the patient from such density profiles which are associated with successive directions in which the patient has been irradiated. For example, high and low density values in the density distribution correspond to parts of the patient in which the X-rays are strongly absorbed and weakly absorbed, respectively. Furthermore, the reconstruction unit can derive an image of a cross-section in a plane through the patient from the density distribution. Such an image may represent, for example a cross-section of the patient to be examined. An image of this kind can be displayed on a monitor 14 which is coupled to the reconstruction unit. The image may alternatively be stored in the form of a digital image matrix or be applied to an image processing unit 15 for further processing. The computed tomography device also includes an arithmetic unit 5 which is coupled to the reconstruction unit 4. The reconstruction unit 4 applies the density distribution to the arithmetic unit 5. The arithmetic unit 5 derives accurate values of dimensions of details of the patient, such as the diameter of arteries, from the density distribution.

Figure 2:
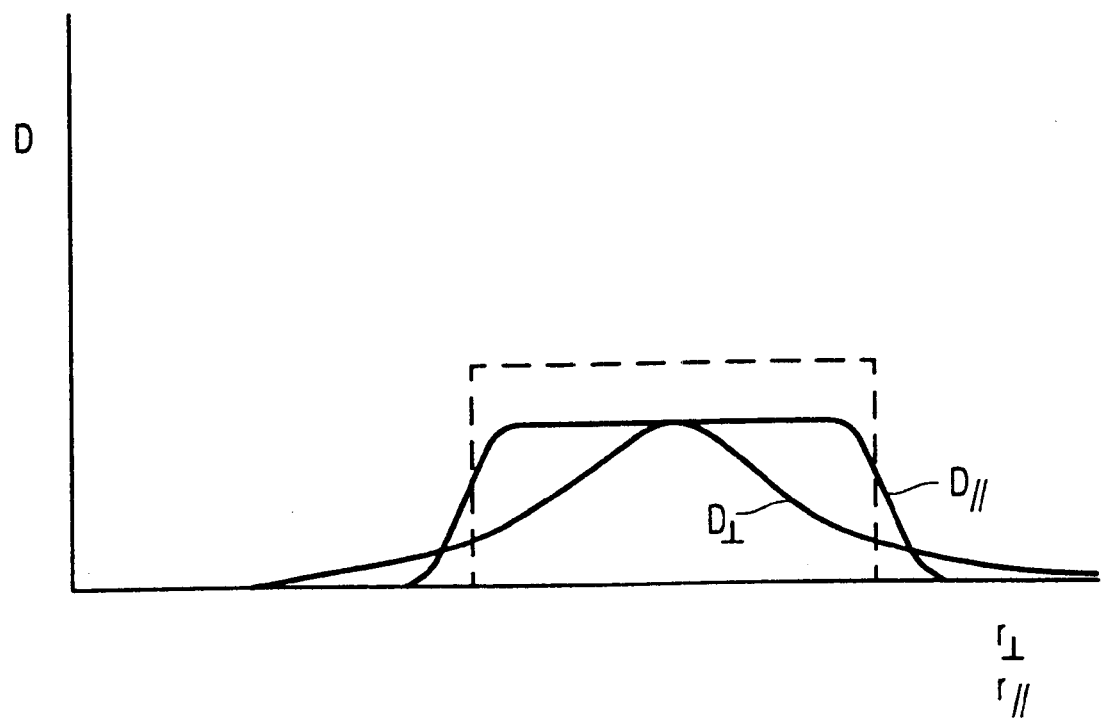
FIG. 2 shows graphically more or less blurred density distributions of a uniform detail having a density which significantly deviates from the density in its vicinity.

FIG. 2 shows graphically more or less blurred density distributions of a uniform detail which has a density which deviates strongly from the density in the vicinity of the detail. More specifically, the dashed curve represents the actual density of the detail in the directions perpendicular to ($r_\perp$) and parallel to ($r_\parallel$) to the preferential direction. The invention will be described, by way of example, on the basis of a detail which has a uniform density which deviates significantly from the density of the vicinity of the detail. Furthermore, the detail has the same dimensions in the directions perpendicular and parallel to the preferential direction. The solid lines represent the density which is derived from the density values reconstructed from X-ray absorption values acquired by means of a computed tomography device. The solid lines thus represent the variation of the measured densities in the respective directions. The lines denoted by $D_\perp$ and $D_\parallel$ respectively represent the variation of the measured densities perpendicular to ($D_\perp$) and parallel to ($D_\parallel$), the preferential direction. Because of the limited spatial resolution with which the X-ray absorption is measured and because the density values are reconstructed therefrom, deviations occur between the measured density and the actual density of the detail. Such deviations become manifest as a lower maximum measured density value in comparison with the actual maximum density of the detail and also manifest as the fact that measured density values in positions outside the relevant detail still have significant values. Such phenomena are usually referred to as "sagging" and "blurring" of the measured density values. It appears that "sagging" occurs if the spatial resolution in one direction is low in comparison with the size of the detail in this direction. In one direction, for example in the preferential direction in which the spatial resolution is high relative to the dimension of the detail in the relevant (preferential) direction, "sagging" hardly occurs but there is "blurring" to some extent. The arithmetic unit 5 is constructed, for example as a suitably programmed computer or a (micro) processor provided with a specially designed electronic circuit for carrying out the method according to the invention. The arithmetic unit is arranged notably to derive the line of intersection of the transverse plane and the scanning plane. The arithmetic unit is also arranged to derive the transverse plane as being a plane perpendicular to the longitudinal axis of the detail, for example an artery. The information concerning the longitudinal axis can be derived from the density values by the arithmetic unit, but such information can also be separately applied to the arithmetic unit. The arithmetic unit includes an input port 16 for this purpose. Information concerning the preferential direction, for example the orientation of the scanning plane, is also applied to the arithmetic unit 5 via the input port 16. However, it is to be noted that the preferential direction can also be derived from the data set itself. For example, the preferential direction is the direction in the multidimensional space in which the gradients of the data values are comparatively large. The arithmetic unit is also arranged to calculate the dimensions of the detail from density values along the line of intersection, for example by applying a full-width-half-maximum method to such density values along the line of intersection.

What is claimed is:

1. A method of deriving a dimension of an object from a data set of data values assigned to a multidimensional space and relating to the object, said method comprising:

choosing a first direction of the data set of data values in the multidimensional space, wherein a spatial resolution of the object in the first direction is greater than a spatial resolution of the object in any other direction in the multidimensional space; and deriving the dimension of the object from the first direction of the data set of data values.

2. The method as claimed in claim 1, further comprising:

acquiring the data set of data values in a scanning plane in a cross-section of the object;

determining a longitudinal axis of the object;

deriving a transverse plane of the longitudinal axis of the object; and deriving a line of intersection of the transverse plane and the scanning plane, wherein the first direction is along the line of intersection.

3. The method as claimed in claim 1, wherein deriving the dimension of the object from the first direction of the data set of data values includes:

determining edge positions of the object in the first direction; and deriving the dimension of the object from the edge positions.

4. The method as claimed in claim 3, wherein a subset of data values from the data set of data values corresponding to the edge positions are equal to a preselected fraction of a maximum value of the data set of data values.

5. The method as claimed in claim 1, further comprising implementing an X-ray computed tomography technique to acquire the data set of the data values.

6. The method as claimed in claim 1, further comprising implementing a magnetic resonance imaging technique to acquire the data set of the data values.

7. The method as claimed in claim 1, further comprising implementing a 3D ultrasound imaging technique to acquire the data set of the data values.

8. A device for deriving a dimension of an object from a data set of data values assigned to a multidimensional space and relating to the object, said device comprising:

means for choosing a first direction of the data set of data values in the multidimensional space, wherein a spatial resolution of the object in the first direction is greater than a spatial resolution of the object in any other direction in the multidimensional space; and means for deriving the dimension of the object from the first direction of the data set of data values.

9. A system, comprising:

a device operable to acquire a data set of data values assigned to a multidimensional space and relating to an object;

means for choosing a first direction of the data set of data values in the multidimensional space, wherein a spatial resolution of the object in the first direction is greater than a spatial resolution of the object in any other direction in the multidimensional space; and means for deriving the dimension of the object from the first direction of the data set of data values.

* * * * *